United States Patent
Cendejas et al.

(10) Patent No.: US 6,216,974 B1
(45) Date of Patent: Apr. 17, 2001

(54) ORIENTATION APPARATUS FOR AN EMERGENCY LOCKING MECHANISM IN A VEHICLE SEAT BELT RETRACTOR

(75) Inventors: Luis Cendejas, Mutlangen (DE); Matthew C. Frank, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/320,920

(22) Filed: May 27, 1999

(51) Int. Cl.[7] ............................................ B65H 75/48
(52) U.S. Cl. ............................................... 242/384.4
(58) Field of Search ................ 242/384.4; 280/806; 297/478

(56) References Cited

U.S. PATENT DOCUMENTS

| | | | |
|---|---|---|---|
| 4,143,831 | * 3/1979 | Cunningham et al. | 242/384.4 |
| 4,228,969 | * 10/1980 | Swensson | 242/384.4 |
| 4,844,374 | 7/1989 | Mori . | |
| 5,145,123 | 9/1992 | Kotikovsky . | |
| 5,495,994 | 3/1996 | Rumpf et al. . | |
| 5,568,941 | 10/1996 | Woydick et al. . | |
| 5,716,102 | 2/1998 | Ray et al. . | |

FOREIGN PATENT DOCUMENTS

1528184  * 10/1978 (GB) .................................. 242/384.4

* cited by examiner

Primary Examiner—Katherine A. Matecki
(74) Attorney, Agent, or Firm—Karolli, Sundheim, Covell, Tummino & Szabo L.L.P.

(57) ABSTRACT

An apparatus (10) includes a first structure (90, 72) having a seat surface (74) configured to engage and support an inertia weight (70) for inertial movement under the influence of a vehicle crash condition. The apparatus (10) further includes a second structure (92) configured to support the first structure (90) in a vehicle seat belt retractor (14). The first structure (90) has an arcuate array of first orientation teeth (96). The second structure (92) has an arcuate array of second orientation teeth (116). The second orientation teeth (116) are configured to receive the first orientation teeth (96) in meshing engagement in any selected one of a plurality of different circumferential orientations relative to the arcuate array of second orientation teeth (116).

4 Claims, 3 Drawing Sheets

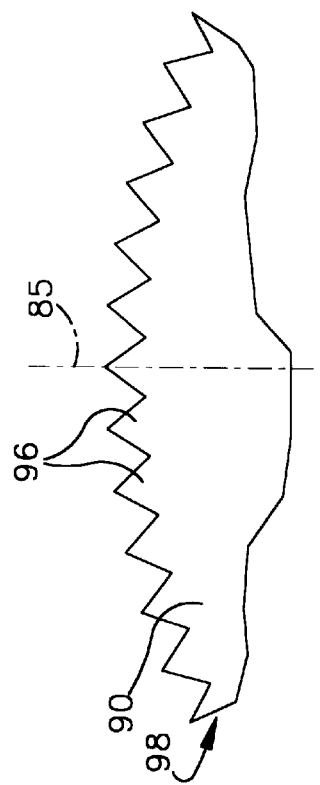
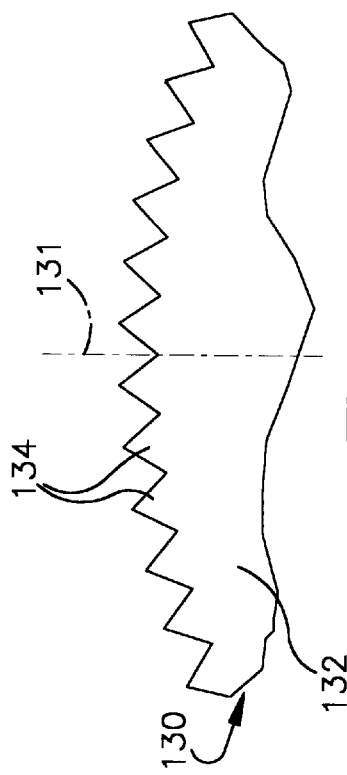
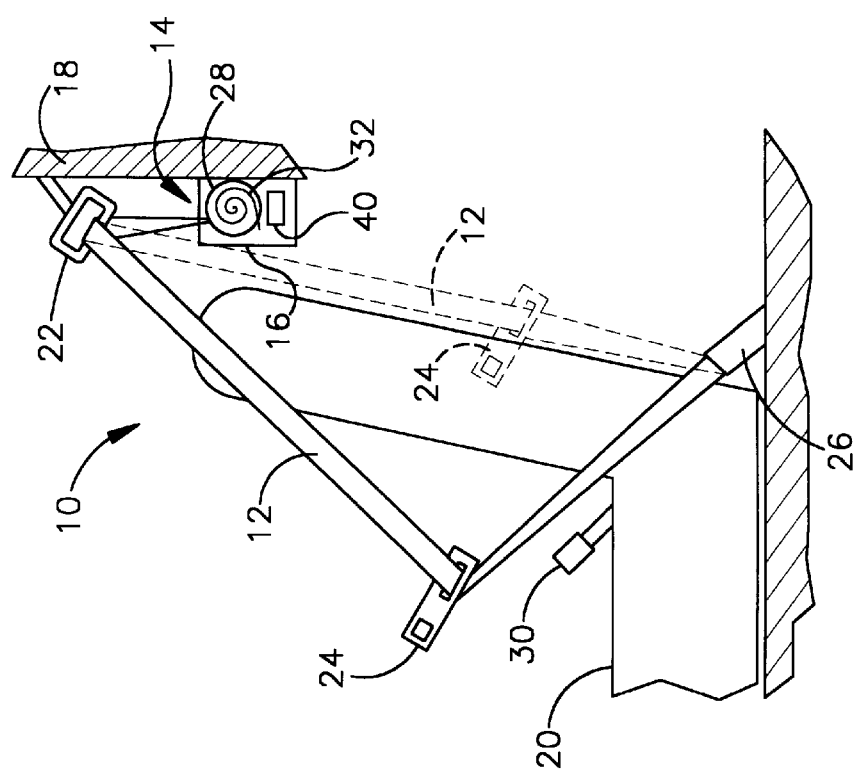

ORIENTATION APPARATUS FOR AN EMERGENCY LOCKING MECHANISM IN A VEHICLE SEAT BELT RETRACTOR

FIELD OF THE INVENTION

The present invention relates to a vehicle seat belt retractor, and particularly relates to an emergency locking mechanism in a vehicle seat belt retractor.

BACKGROUND OF THE INVENTION

A seat belt system for restraining an occupant of a vehicle ordinarily includes seat belt webbing, a seat belt buckle, and a seat belt retractor. A tongue on the webbing is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

The occupant may move forcefully against the webbing when the vehicle experiences a crash. The force that the occupant applies to the webbing urges the webbing to move outward from the retractor. Therefore, a seat belt retractor typically includes an emergency locking mechanism which is actuated in response to a vehicle crash condition. The emergency locking mechanism then blocks unwinding rotation of the spool to prevent the webbing from moving outward from the retractor.

An emergency locking mechanism may include an inertia weight. The inertia weight is movable under the influence of sudden vehicle deceleration that is caused by a crash. Such an emergency locking mechanism is actuated when the inertia weight moves from an unactuated position to an actuated position. Accordingly, the retractor is mounted in the vehicle in an orientation in which the inertia weight normally rests in the unactuated position.

SUMMARY OF THE INVENTION

In accordance with the present invention, an apparatus comprises a first structure having a seat surface configured to engage and support an inertia weight for inertial movement under the influence of a vehicle crash condition. The apparatus further comprises a second structure configured to support the first structure in a vehicle seat belt retractor.

The first structure has an arcuate array of first orientation teeth. The second structure has an arcuate array of second orientation teeth. The second orientation teeth are configured to receive the first orientation teeth in meshing engagement in any selected one of a plurality of different circumferential orientations relative to the arcuate array of second orientation teeth.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a schematic view of a vehicle occupant restraint apparatus comprising a first embodiment of the invention;

FIG. 6A is an enlarged partial view of a part shown in FIGS. 2–4; and

FIG. 6B is an enlarged partial view of another part of the first embodiment of the invention.

DESCRIPTION OF A PREFERRED EMBODIMENT

Figure 2:
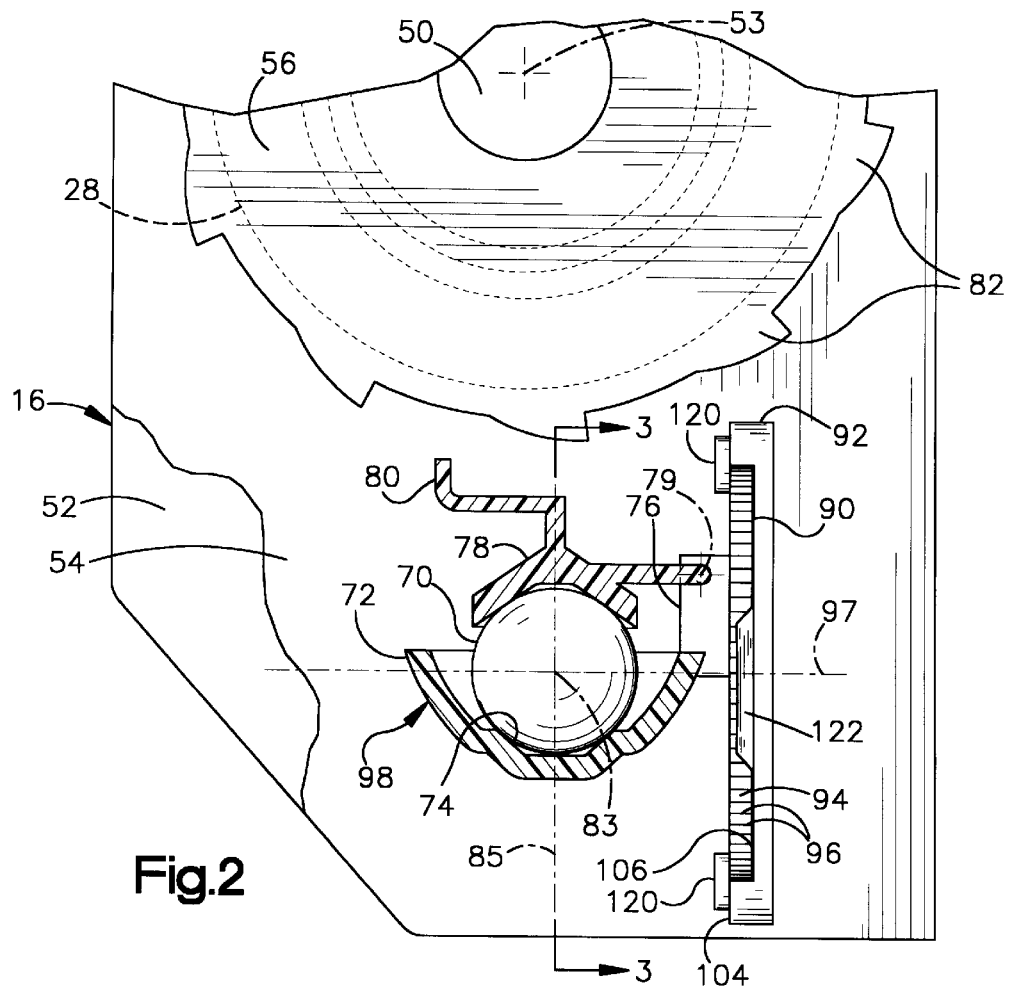
FIG. 2 is a view of parts of the apparatus of FIG. 1, with certain parts being shown schematically.

A vehicle occupant restraint apparatus 10 comprising a preferred embodiment of the present invention is shown schematically in FIG. 1. The apparatus 10 is a seat belt system including seat belt webbing 12 and a seat belt retractor 14 for the webbing 12. The retractor 14 has a frame 16 which is mounted on a vehicle pillar 18 adjacent to a vehicle seat 20. The seat belt system 10 further includes a D-ring or turning loop 22, a tongue 24 and an anchor 26. The webbing 12 extends from the retractor 14 to the anchor 26 through the D-ring 22 and the tongue 24.

A spool 28 is mounted on the retractor frame 16. The webbing 12 is wound on the spool 28, and is movable back and forth between a fully retracted position and a fully extracted position upon winding of the webbing on the spool 28 and unwinding of the webbing 12 from the spool 28. When the webbing 12 is in the fully retracted position, it is fully wound onto the spool 28. A portion of the webbing 12 is located on one side of the seat 20, as shown in dashed lines in FIG. 1. When the webbing 12 is in the fully extracted position, it is fully unwound from the spool 28. The webbing 12 then extends from the retractor 14 sufficiently to enable the tongue 24 to reach a buckle 30 at the other side of the seat 20. A rewind spring 32 in the retractor 14 is stressed as the spool 28 rotates in an unwinding direction when a vehicle occupant extracts the webbing 12 from the retractor 14 and moves the tongue 24 toward the buckle 30. When the vehicle occupant releases the tongue 24 from the buckle 30, the rewind spring 32 rotates the spool 28 in the winding direction to retract the webbing 12 into the retractor 14, and thereby to move the webbing 12 back to the fully retracted position.

The retractor 14 has an emergency locking mechanism 40. If the vehicle experiences a crash condition such as, for example, deceleration at or above a specified threshold level, this indicates the occurrence of a crash having at least a corresponding threshold level of severity. The threshold level of crash severity is a level at which the webbing 12 is desired to restrain an occupant of the seat 20. Accordingly, the emergency locking mechanism 40 responds by blocking unwinding rotation of the spool 28 so that the webbing 12 can restrain an occupant of the seat 20.

As shown in FIG. 2, the spool 28 has a central shaft 50. The shaft 50 extends longitudinally between a pair of opposed metal frame walls 52, one of which is shown in FIG. 2, and is journalled in the frame walls 52 for rotation about a spool axis 53. A plastic side panel structure 54 overlies the frame wall 52 shown in FIG. 2. A ratchet wheel or a pair of ratchet wheels 56, one of which also is shown in FIG. 2, are fixed to the opposite ends of the shaft 50 for rotation about the spool axis 53 with the spool 28.

The emergency locking mechanism 40 includes an inertia weight in the form of a sensor ball 70. The sensor ball 70 is received in a generally cup-shaped ball housing 72, and is seated in a rest position on a ball seat surface 74 near the bottom of the housing 72. A pair of arms 76 (FIG. 3) project upward from the top of the housing 72. A sensor lever 78 rests on the sensor ball 70. The lever 78 is journalled in the arms 76 for movement relative to the housing 72 pivotally about a corresponding axis 79. An upper end portion 80 (FIG. 2) of the lever 78 is configured as a locking pawl for the ratchet wheel 56.

If the vehicle experiences a crash condition at or above the specified threshold level, as described above, the inertia of the sensor ball 70 will cause it to roll up the ball seat surface 74 from the rest position to an actuated position. As the sensor ball 70 moves to the actuated position, it lifts the lever 78 pivotally to a position in which the locking pawl 80 extends into the path of movement of ratchet teeth 82 on the ratchet wheel 56 to block unwinding rotation of the spool 28.

Figure 4:
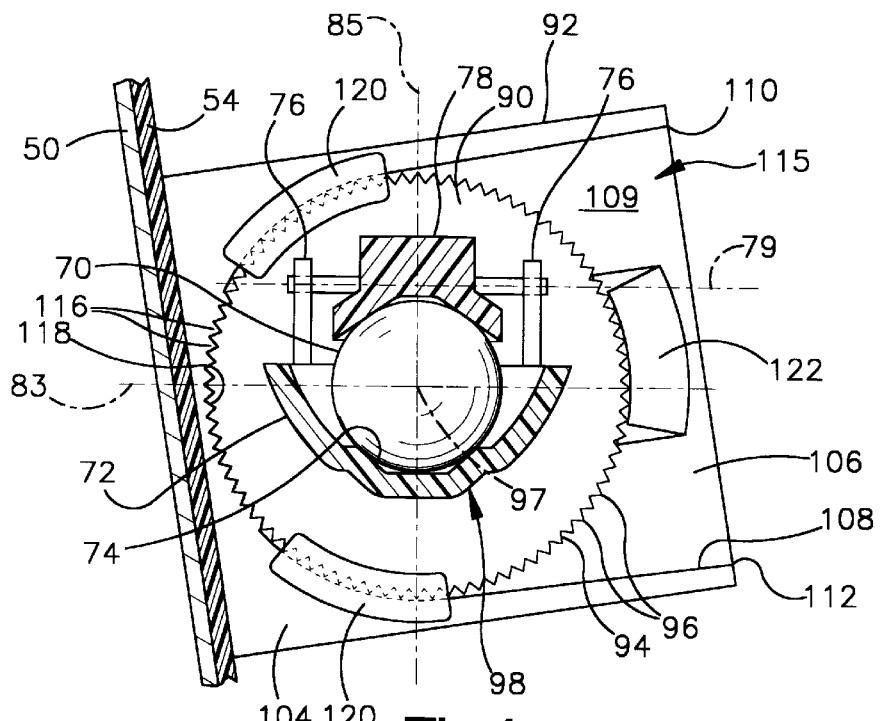
FIG. 4 is a view of the parts shown in FIG. 3, with certain parts being shown in different orientations relative to each other.

The retractor 14 may be mounted on the vehicle pillar 18 (FIG. 1) such that the frame 16 is inclined from the orientation in which it is shown in FIG. 2. For example, the frame 16 may have the orientation in which it is shown in FIG. 4. The frame 16 is then offset from the orientation of FIG. 2 in a counterclockwise direction, as viewed in FIGS. 2 and 4, pivotally about a horizontal central axis 83 of the sensor ball 70. The emergency locking mechanism 40 is configured in accordance with the present invention to accommodate such different inclinations of the frame 16. Specifically, the ball seat surface 74 has a generally conical contour centered on an axis 85. The emergency locking mechanism 40 is configured such that the axis 85 can be vertical or substantially vertical, as shown in FIGS. 2 and 4, even if the frame 16 is offset from the orientation of FIG. 2 pivotally about the horizontal axis 83 of the sensor ball 70.

Other parts of the emergency locking mechanism 40 include an orientation disk 90 and an orientation platform 92. A peripheral edge surface 94 of the disk 90 defines a plurality of orientation teeth 96. The orientation teeth 96 are arranged in a circular array (FIG. 3) extending 360° about an axis 97.

In the preferred embodiment of the present invention, the housing 72 and the disk 90 are portions of a one-piece ball seat structure 98 which is made from a single homogenous plastic material. By "one-piece" it is meant that the ball seat structure 98 is a single unit exclusive of separate but joined elements. The ball seat structure 98 could alternatively include separate but joined elements, and materials other than plastic could be used. In each case, the housing 72 is fixed relative to the disk 90.

The platform 92 supports the ball seat structure 98 on the retractor frame 16. In the preferred embodiment of the invention, the platform 92 and the side panel structure 54 are portions of another one-piece plastic part. The platform 92 projects from the side panel structure 54 in a direction parallel to the spool axis 53 (FIG. 2), and is thus oriented perpendicular to the side panel structure 54 and the adjacent wall 52 of the frame 16.

Figure 3:
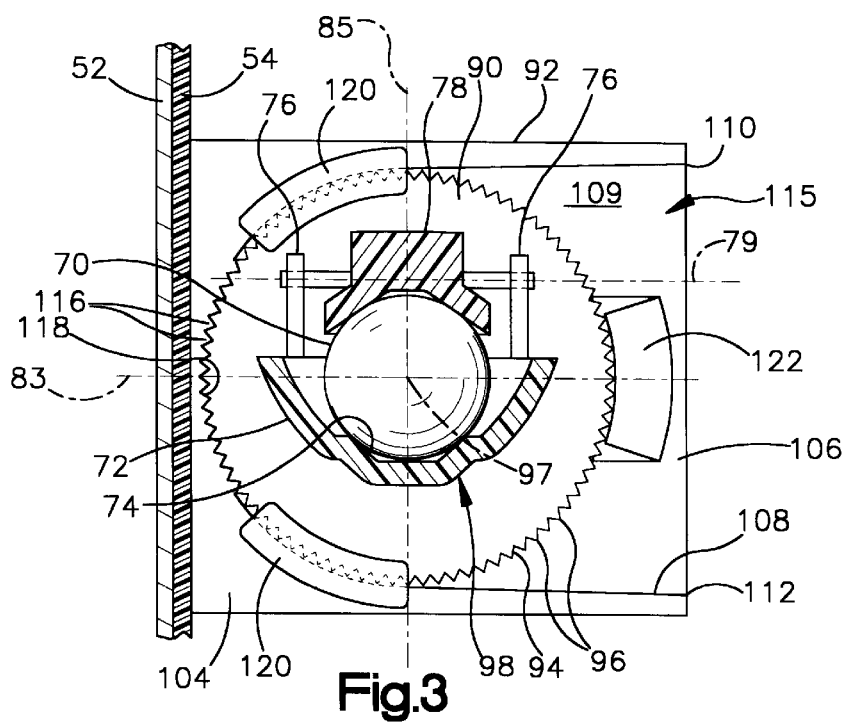
FIG. 3 is a view taken on line 3—3 of FIG. 2.
Figure 5:
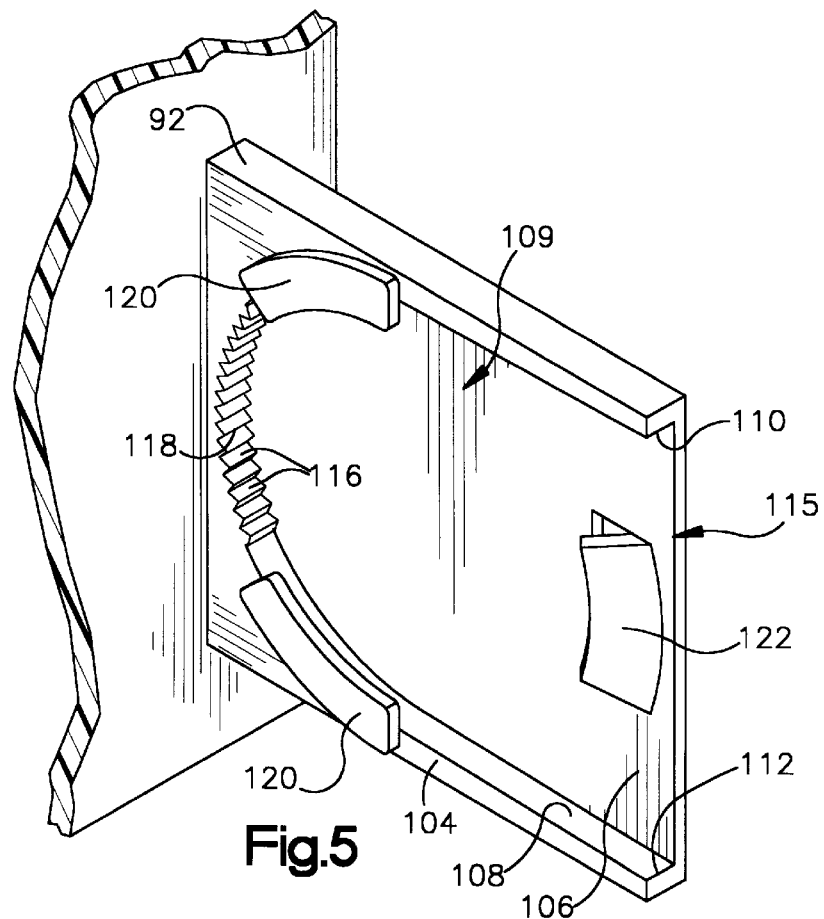
FIG. 5 is a view of a part shown in FIGS. 2–4.

As best shown separately in FIG. 5, the platform 92 has first and second generally parallel, front side surfaces 104 and 106. The second front side surface 106 is recessed from the first front surface 104. An inner edge surface 108 of the platform 92 extends between the first and second front side surfaces 104 and 106. The inner edge surface 108 thus defines the depth and peripheral boundaries of a recess 109 for receiving the orientation disk 90 (FIGS. 2–4). More specifically, the inner edge surface 108 has a generally U-shaped configuration between its opposite ends 110 and 112. The recess 109 has a corresponding configuration with an open end 115 defined between the opposite ends 110 and 112 of the inner edge surface 108. An intermediate portion of the inner edge surface 108 defines an arcuate array of orientation teeth 116 at the closed end 118 of the recess 109.

The disk 90 on the ball seat structure 98 is received through the open end 115 of the recess 109 in the platform 92, and is moved from right to left, as viewed in the drawings, to the closed end 118 of the recess 109. The orientation teeth 96 on the disk 90 mesh with the orientation teeth 116 on the platform 92 when the disk 90 reaches the closed end 118 of the recess 109. A pair of retainer tabs 120 on the platform 92 hold the disk 90 firmly against the second front side surface 106 of the platform 92. A flexible locking tab 122 on the platform 92 interlocks the disk 90 with the platform 92 when the disk 90 reaches the closed end 118 of the recess 109.

Importantly, the teeth 96 on the disk 90 can be moved into meshing engagement with the teeth 116 on the platform 92 in any selected one of a plurality of orientations that differ from each other circumferentially relative to the arcuate array of the teeth 116 on the platform 92. This enables the central axis 85 of the ball seat surface 74 to be vertical, or substantially vertical, even if the frame 16 has any one of a corresponding number of orientations that are pivotally offset from the orientation of FIG. 2, as described above.

An additional feature of the present invention is shown in FIGS. 6A and 6B. FIG. 6A is an enlarged partial view of the ball seat structure 98. As shown in FIG. 6A, one of the teeth 96 on the disk 90 is centered on the vertical central axis 85 of the ball seat surface 74 (FIGS. 2–4).

FIG. 6B is an enlarged partial view of an additional ball seat structure 130 configured in accordance with the present invention. The additional ball seat structure 130 is substantially similar to the ball seat structure 98, and thus defines the vertical central axis 131 of a respective ball seat surface (not shown) for supporting the sensor ball 70 in the rest position. A disk portion 132 of the additional ball seat structure 130 has a circumferentially extending array of orientation teeth 134.

Like the teeth 96 of FIG. 6A, the teeth 134 of FIG. 6B are configured to mesh with the teeth 116 on the platform 92. However, as measured from the corresponding vertical axis 131 (and the respective ball seat surface), the teeth 134 are circumferentially offset from the teeth 96. Preferably, the additional ball seat structure 130 of FIG. 6B is one of a plurality of additional ball seat structures that can be substituted for the ball seat structure 98. Each additional ball seat structure has an arcuate array of teeth like the teeth 134, with each array of teeth having a unique orientation circumferentially relative to the respective ball seat surface.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   an inertia weight that moves under the influence of a vehicle crash condition;
   a first structure having a seat surface for engaging and supporting said inertia weight, said first structure further including an arcuate array of first orientation teeth; and
   a second structure for supporting said first structure in a vehicle seat belt retractor, said second structure having first and second front side surfaces and an inner edge surface, said first front side surface forming an outer surface of said second structure, said second front side surface and said inner edge surface defining a recess with said second front side surface forming a bottom surface of said recess and said inner edge surface forming a periphery of said recess, said inner edge surface being U-shaped;

said recess in said second structure having an open end and a closed end, an arcuate portion of said inner edge surface forming said closed end of said recess, said open end of said recess being opposite said closed end of said recess, said arcuate portion of said inner edge surface having an arcuate array of second orientation teeth that are configured to receive said arcuate array of first orientation teeth of said first structure in meshing engagement in any selected one of a plurality of different circumferential orientations relative to said arcuate array of second orientation teeth when said first structure is inserted into said recess through said open end and is moved into engagement with said arcuate portion of said inner edge surface of said second structure.

2. The apparatus of claim 1 wherein said second structure further includes at least two retainer portions that extend from said first front side surface to overlie a portion of said recess for retaining said first structure in said recess.

3. The apparatus of claim 2 wherein said second front side surface of said second structure includes at least one flexible portion that protrudes into said recess for securing said first structure in said recess of said second structure.

4. The apparatus of claim 3 wherein said first structure includes a disk, said arcuate array of first orientation teeth located on a peripheral edge surface of said disk; and said flexible portion of said second structure engaging said peripheral edge surface of said disk when said arcuate array of first orientation teeth of said first structure are in meshing engagement with said arcuate array of second orientation teeth of said second structure.

* * * * *